US006142337A

United States Patent [19]

Schreckenberg et al.

[11] Patent Number: 6,142,337

[45] Date of Patent: *Nov. 7, 2000

[54] TABLET DISPENSER

[75] Inventors: Bernd Schreckenberg; Ludger Südkamp, both of Lohne, Germany

[73] Assignee: Bramlage GmbH, Lohne, Germany

[ * ] Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 263 days.

[21] Appl. No.: 08/707,097

[22] Filed: Sep. 3, 1996

[30] Foreign Application Priority Data

Sep. 2, 1995 [DE] Germany ........................ 295 14 137 U

[51] Int. Cl.[7] ........................................ B65G 59/00

[52] U.S. Cl. ........................................ 221/263; 221/266

[58] Field of Search ........................................ 221/266, 263; 215/224

[56] References Cited

U.S. PATENT DOCUMENTS

| | | | |
|---|---|---|---|
| 2,206,209 | 7/1940 | Thorn | 221/64 |
| 4,696,415 | 9/1987 | Meshberg . | |
| 5,018,644 | 5/1991 | Hackmann . | |
| 5,108,006 | 4/1992 | Tieke et al. | 221/266 |
| 5,123,574 | 6/1992 | Poulos . | |

FOREIGN PATENT DOCUMENTS

| | | | |
|---|---|---|---|
| 236039 | 9/1987 | European Pat. Off. | 221/263 |
| 290972 | 11/1988 | European Pat. Off. | 221/266 |
| 0 345 413 | 12/1989 | European Pat. Off. . | |
| 0 408 774 A1 | 1/1991 | European Pat. Off. . | |

*Primary Examiner*—Christopher P. Ellis
*Assistant Examiner*—Khoi H. Tran
*Attorney, Agent, or Firm*—Sonnenschein Nath & Rosenthal

[57] ABSTRACT

A tablet dispenser having a housing with a cover and base part that can be placed therein, and having an axially movable sliding part that is set through the housing, which dispenses one individual tablet respectively from a heap of tablets upon actuation by finger pressure on a button. The opening of a seal is avoided, and, after the removal of the individual tablet, the dispenser can be hermetically closed again without difficulty and without the contamination of further tablets. Specifically, this is achieved in that the sliding part has in the upper region an actuating bar connected to the cover, and in that the cover acts as a resilient resetting element, and in that the sliding part comprises in the lower region an allocating element, pushable through rotationally selectable openable passage in the base part and so as to be able to receive one tablet respectively, and in that the base part comprises a rotating seal.

40 Claims, 3 Drawing Sheets

TABLET DISPENSER

BACKGROUND OF THE INVENTION

The present invention concerns a tablet dispenser having a housing with a cover and base part that can be set therein, and having a sliding part set through the housing in an axially movable manner.

Preparations of active ingredients in a homogeneous mixture with base materials and filling materials in the form of solid tablets for individual dosage are known and widely distributed for health care, fighting illness, strengthening the constitution and the like.

Tablets of this sort are either packaged individually, as what are known as film tablets, on bearer cards transparent on one side (blister packaging), or are packaged in pourable form in a bulk manner in a tube- or bottle-shaped supply container that can be sealed with a removable lid. This latter form of supply containment and presentation has a number of disadvantages.

Since the removable seal is supposed to close in as gastight and moisture-tight a manner as possible, it is often very difficult, without a large exertion of force, to remove it from the supply container or replace it thereon.

A further disadvantage of this packaging is that for the removal of product from the opened container, since the opening thereof is too small to reach in with the fingers and remove a tablet, the container must be held with the opening at a downward angle, and a tablet must be poured out. Usually, several tablets fall out thereby, which are then already rendered impure or even contaminated through contact with an extended hand and/or the environment. In most cases, this is in any case unhygienic and undesirable. Next, the superfluously removed tablets are placed back into the container and the container is again closed with an exertion of force, whereby an adequate seal is by no means always ensured, due to the difficulty of manipulating the sealing element.

SUMMARY OF THE INVENTION

An object of the invention is to provide a tablet dispenser that avoids the above-named disadvantages and difficulties, and respectively dispenses only a single tablet from a heap of tablets through actuation by means of pushing a button, which avoids the opening of a seal and is again hermetically sealable without difficulty and without contamination after the removal of the single tablet, whereby this tablet dispenser moreover should be suitable for a very economical manufacture and problem-free disposal.

The object is achieved in a tablet dispenser of the type named above by means of the invention, which provides a tablet dispenser having a housing with a cover and a base part that can be placed therein and an axially movable sliding part that is set through the housing, characterized in that the sliding part comprises in the upper region an actuating bar that can be snapped into a connecting element of the cover. The cover is fashioned with an upwardly concave curvature made of soft elastic plastic and acts as a resilient resetting element. The sliding part comprises in the lower region an allocating element that can receive respectively one tablet or a predetermined number of tablets, and can be pushed through an adequate passage opening in the base part, and the base part comprises a rotating seal that is fashioned with the passage opening and that can be adjusted between a passage position, in which the passage opening is cleared, and a blocking position, in which the passage opening is sealed.

A new type of tablet dispenser results in a surprisingly uncomplicated way with the inventive design, which dispenses a tablet respectively through the base part with the pressure of a finger, preferably of a thumb, on the yielding cover element, without its being necessary to open the housing, and without the rest of the tablets in the container coming into contact with and being contaminated by the person removing them or by the environment, and in which the removal of an individual tablet can be carried out without difficulty and without undue exertion of force.

According to its inventive design, the tablet dispenser is constructed so that it can be manufactured and assembled with the greatest degree of economy. Thus, for example the sliding part, fashioned as a dispenser element, can be snapped into a connection element of the cover by means of an actuation bar connected with the sliding part; in addition, the cover itself, and also the base part, can respectively be snapped into the housing, which is preferably constructed so as to be rotationally symmetrical. This design is particularly suited for a fully automatic assembly of the individual parts forming the tablet dispenser, e.g. by means of a mechanical-automatic device, and the dispenser can thus be manufactured and assembled in an extremely economical way.

It is thereby highly advantageous that the cover is fashioned with an upwardly concave curvature, and is made of soft elastic plastic as a resilient resetting element. The solution hereby found is not only useful but also saves costs, is elegant, and enables an actuation without opening the container.

Furthermore, a hermetic dispensing of the tablets contained in the container is advantageously enabled in that the sliding part comprises in its lower region an allocating element, fashioned so as to respectively receive one tablet and so as to be able to be pushed through an adequate passage opening in the base part, whereby the base part comprises a rotating seal, which is formed with the passage opening, and is arranged between a passage position, in which the passage opening is cleared, and a blocking position, in which the passage opening is sealed.

In the following, the invention is shown in drawings based on an exemplary embodiment, whereby further advantageous features of the subject matter of the invention can be recognized from the drawings and the specification.

DETAILED DESCRIPTION OF THE PREFERRED EMBODIMENTS

Figure 1:
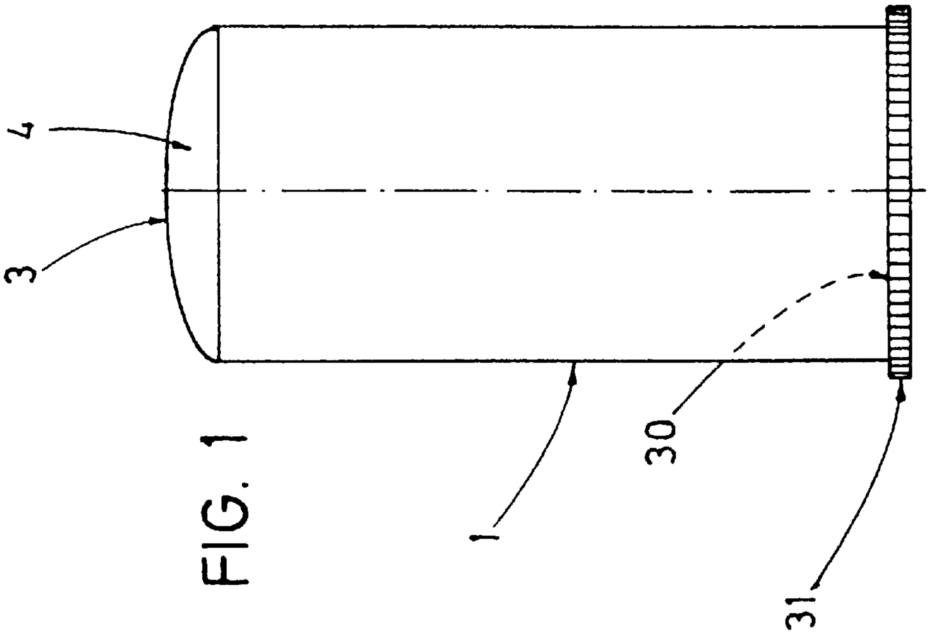
FIG. 1 is an elevational view of the dispenser of the present invention.

The tablet dispenser shown in FIG. 1 comprises a housing 1 and a cover 3 that can be set thereon, as well as a base part 20. Advantageously, the housing 1 has an outwardly smooth shape, which is convenient to manufacture, preferably in the shape of a cylinder, and is usefully made of plastic.

It can be seen from a combined view of FIGS. 1 to 4 that the housing comprises an axially movable sliding part 10 set through the housing, upon actuation of which a tablet 41 (or a preselected number of tablets) is expelled through the passage opening 21 in the base part 20 by means of the allocating element 15 arranged at the end of the sliding part.

The sliding part 10 comprises at its upper end an actuating bar 11 that can be snapped into a connecting element 5 of the cover 3. By means of this bar, the sliding part is connected with the cover 3, whereby the cover 3 is fashioned as a resilient resetting element with an upwardly concave curvature 4, made of soft elastic plastic. The sliding part 10 comprises in its lower region an allocating element 15, fashioned so as to be able to receive one tablet 41 respectively and so as to be able to be pushed through an adequate passage opening 21 in the base part 20, and the base part 20 has a rotating seal 30, which is formed with a passage opening 21, and can be adjusted between a passage position, in which the passage opening 21 is cleared, and a blocking position, in which the passage opening is sealed.

For comfortable operation, this rotating seal 30 can be provided over the outer diameter of the housing 1 with a protuberant grippable knurling 31, and the turning angle of the seal can be limited by stoppers. However, these are not shown for reasons of clarity, and can be realized by one skilled in the art in any known manner.

Figure 2:
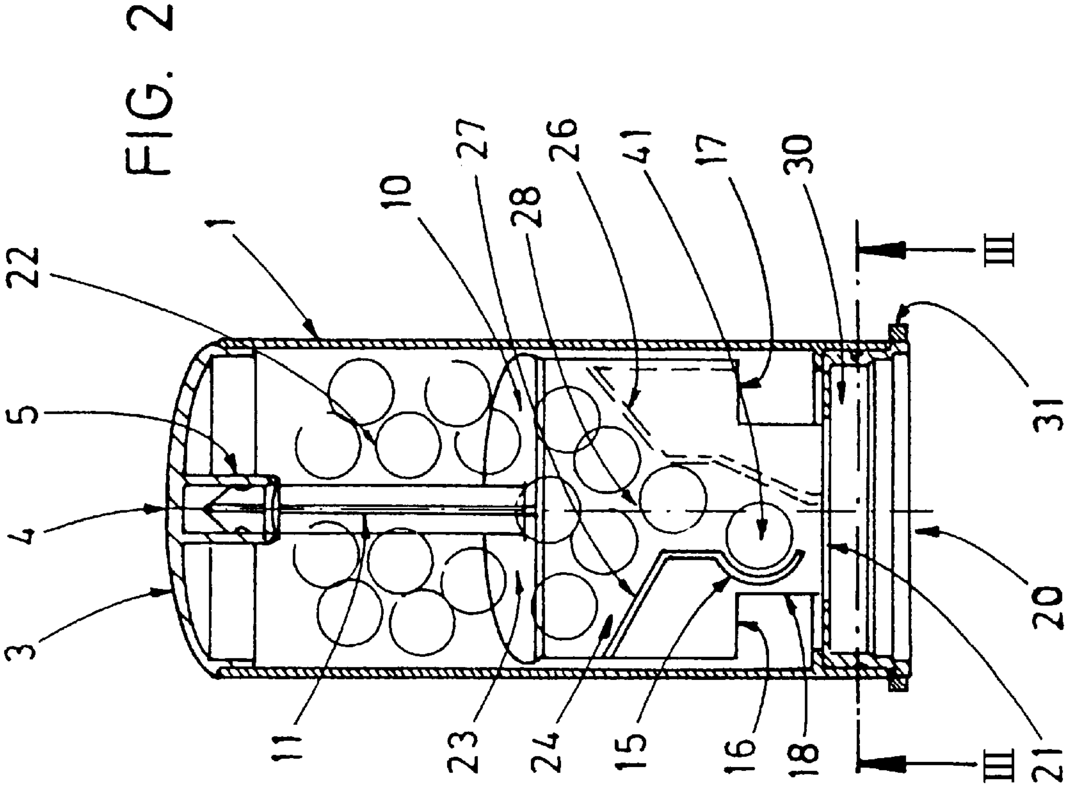
FIG. 2 is a longitudinal sectional of the dispenser along a sectioning plane running through the midaxis of the dispenser.
Figure 4:
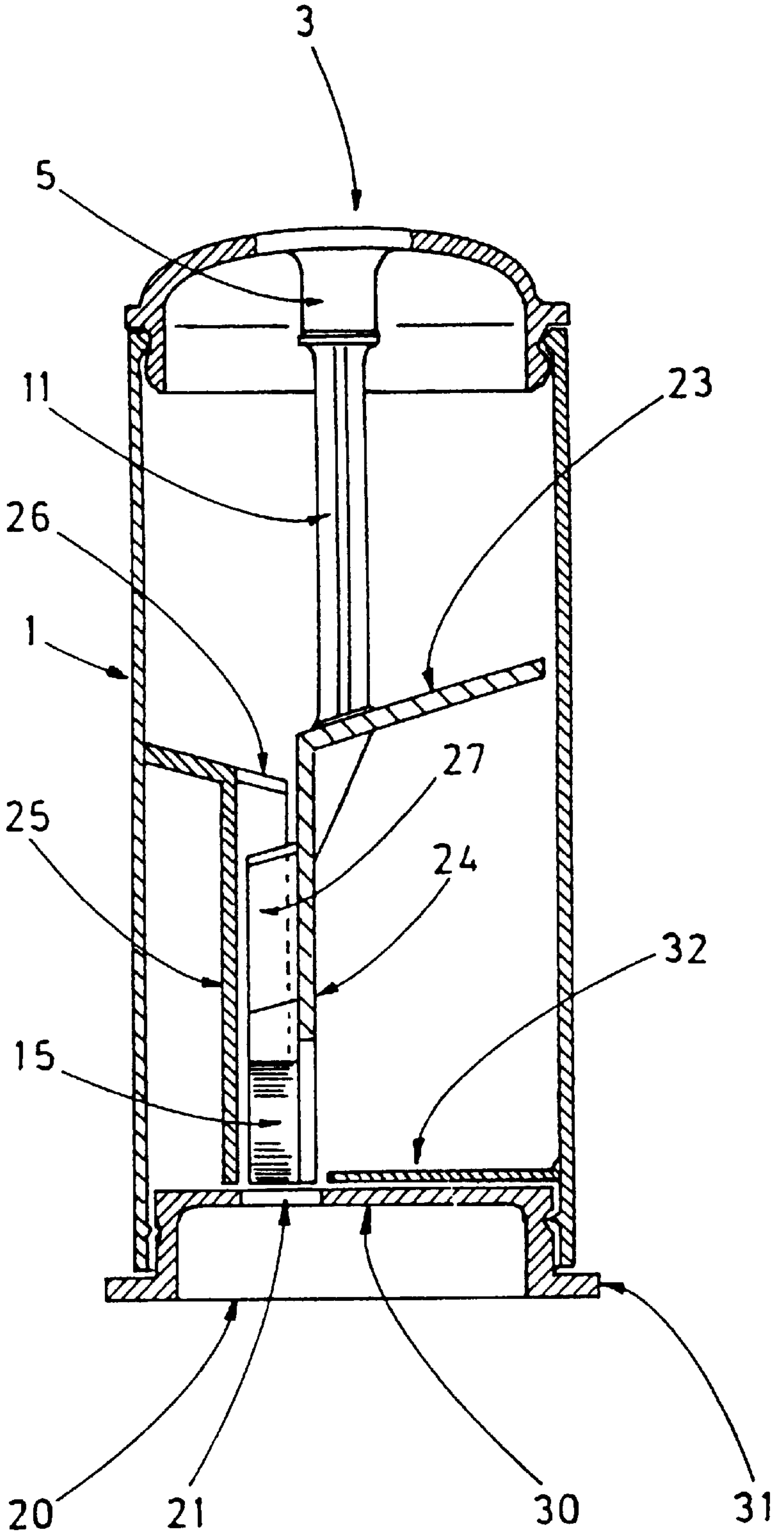
FIG. 4 is a sectional view of the tablet dispenser, sectioned along a plane rotated 90° in relation to the sectioning plane in FIG. 2.

As can be seen clearly from FIGS. 2 and 4, at the lower end of the actuating bar 11 the sliding part 10 verges into an approximately semicircular diaphragm 23, which can be guided along the inner wall of the housing with a small clearance therebetween, and defines an upper supply chamber 22, and is inclined obliquely downwards, which continues against the base part 20 with a vertical apron 24, and, working together with a vertical guide 25 arranged at a distance from the housing inner wall, as can best be seen in FIG. 4, forms a funnel-shaped chute 28 that can be bounded by lateral guide webs 26 or, respectively, 27, whereby one of the webs 26 is arranged on the guide 25 and the other web 27 is arranged on the apron 24 so as to form the allocating element 15.

As can be further seen from a combined view of FIGS. 2 and 4, the apron 24 is formed with a small clearance from the inner wall of the housing on both vertical sides, as is the diaphragm 23 at its upper half-round boundary. Furthermore, the apron 24 comprises offsets in the area of the allocating element 15, forming shoulders 16 or, respectively, 17 on both sides next to a central sliding block 18, whereby the shoulders 16, 17 are fashioned as stops for the limitation of the vertical axial motion of the sliding part 10 relative to the exit opening 21. It can be further recognized from FIG. 2 that the allocating element 15 has the shape of a spoon, oriented vertically.

Figure 3:
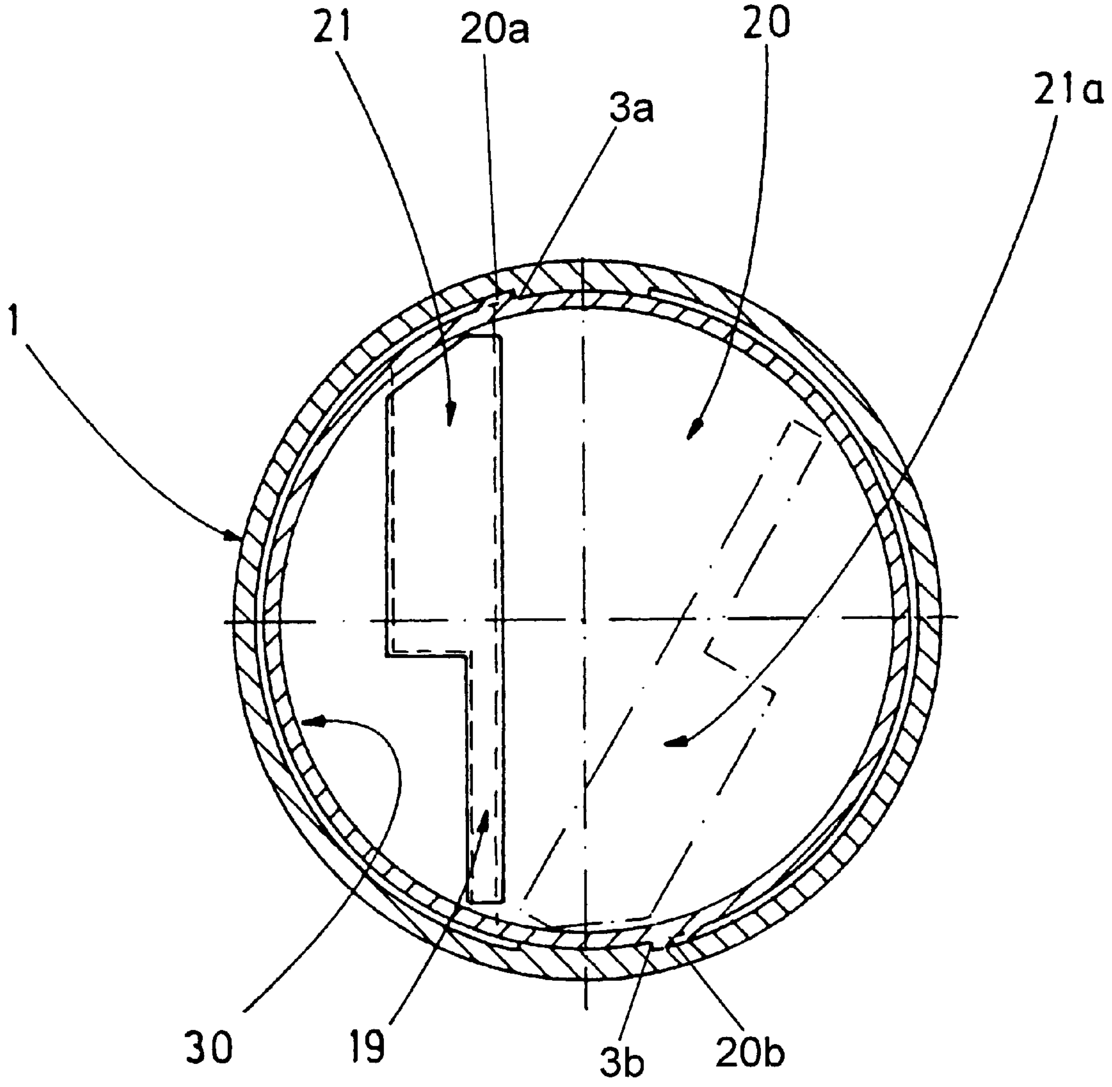
FIG. 3 is an enlarged sectional view taken generally along III—III of FIG. 2 of the base part with the rotating seal and the passage opening.

FIG. 3 shows an enlarged view from below of the base part 20 inside the inner wall of the housing 1. As can also be seen from FIG. 4, the base part 20 snaps into the housing 1. It is fashioned as a rotating seal 30 and comprises the passage opening 21. This opening is basically approximately rectangular with beveled outer edges, and continues to the other side in a slot 19. These serve for the passage of the apron 24 with the allocating element 15 arranged thereon.

Through rotation of the rotating seal 30 by means of actuation on the knurling 31, two positions of the rotating seal can be achieved, namely the position shown at the left in FIG. 3, in which the passage opening 21 is brought into agreement with the arrangement of the apron 24 and the allocating element 15, so that these parts move through upon pressure on the cover 3, with vertical motion of the sliding part 10. A tablet 41 contained in the allocating element 15 then falls out individually through the opening 21 after the passage of the allocating element 15. When the resetting force of the cover 3 causes a resetting, another tablet 41 slips into the allocating element 15 moving back, which is empty for the time being, and the process can be repeated as described.

By means of a useful construction of the inventive dispenser in a preferred rotationally symmetrical embodiment, the base part 20 in the lower region of the housing can be fashioned as a rotating seal 30. The dispenser can thereby be secured in the delivery state, in that the rotating seal 30 is adjusted so that the opening rotates to the position out of registry with the sliding part 10 and is thus sealed. The sliding part 10 is thereby arrested at the same time in its possibility of vertical motion. For a dosing action, the rotating seal 30 must now be turned, whereby the opening moves from the position 21*a* in FIG. 3 and comes into the exit region of the allocating element 15 of the sliding part 10, the position 21 in FIG. 3, and the dispensing action can ensue. Stops 3*a* and 3*b* are formed on an inside of the cover 3 and which interact with protrusions 20*a*, 20*b* respectively of the base past 20 to easily rotationally align the opening 21 with the allocating element 15 of the sliding part 10. After the completion thereof, if desired the rotating seal 30 can again be turned back, and the sliding part can thereby be arrested in its movability, and the passage opening 21 can be effectively sealed.

The rotating seal 30 prevents a dosing action upon pressing of the cover 3 which is not assembled until after filling of the container, since the sliding part 10 seeks to expand downwards as a result of the exertion of force needed to snap the bar 11 into the connecting element 5 of the cover 3, whereby an actuation in the sense of a dosing action would inadvertently ensue. This is prevented when the rotating seal is assembled in the blocking position. In addition, the rotating seal 30 forms at the same time a transport safety device, if the dispenser is delivered in the filled state without surrounding packaging. An undesired dispensing action due to stacking in the box then cannot be triggered.

FIG. 4 shows, in a top view of the rotating seal 30 at a close distance, a cover plate 32 that ensures that the passage opening 21 in the closed position 21*a*, FIG. 3 is completely covered from the inside, so that a hermetic seal of the base part 20 results. Through the rotating away of the passage opening 21 underneath the allocating element 15, a seal results that prevents the penetration of dirt particles or water spray.

There is thereby also the possibility that the passage opening 21, provided as a dispenser opening, can be kept airtight until the first use of the tablet dispenser, by means of a removable safety seal.

The design of the cover 3 for the dispenser as a flexibly acting spring is particularly useful, whereby after the pressing through, the sliding part 10 is again drawn back due to the resetting force of the material, and the next dispensing action can be carried out. Due to this flexible cover 3, no additional spring need be attached in the region of the sliding part of the dispenser. The possibility thereby results of manufacturing the entire device uniformly of plastic, which substantially improves the disposal and recycling of the emptied dispenser. Furthermore, with the flexible cover 3 the possibility ensues of a clean seal of the upper region of the housing over the entire time of use, and thus of preventing the penetration of dust or water spray and/or absorption of moisture by the tablets.

The tablet dispenser is useful, uncomplicated to manufacture and assemble, and is thus suitable for an inexpensive, possibly fully automatic mass production. In this way, the invention thus solves the aim posed above in an optimal manner.

Although the present invention has been described with reference to a specific embodiment, those of skill in the art will recognize that changes may be made thereto without departing from the scope and spirit of the invention as set forth in the appended claims.

We claim as our invention:

1. A tablet dispenser comprising:

a housing;

a cover secured to the housing and having an upwardly concave curved portion of soft-elastic plastic material;

a floor part in the housing and having a rotary closure with a passage opening, the rotary closure being adjustable between a passage position upon release of the passage opening and a blocking position upon closure of the passage opening;

a slide axially movably penetrating the housing, the slide having an actuation rod in an upper region that is snapped into a connector element of the cover, the slide also having a dispenser element in a lower region accepting a tablet which penetrates the passage opening in the floor part; and wherein the upwardly concave curved portion of the cover acts as a resilient restoring element for the dispenser element.

2. The tablet dispenser according to claim 1, wherein the sliding part at the second end of the actuating bar verges into an approximately semicircular diaphragm sized to be guided along an inside wall of the housing, the diaphragm defining an upper supply chamber in the housing inclined obliquely downwards, and which diaphragm continues toward the base part with a vertical apron, and said housing further comprising a vertical guide arranged at a distance from an inside wall of the housing, the diaphragm and the vertical guide together with the apron forming a funnel-shaped chute.

3. The tablet dispenser according to claim 2, wherein the apron has vertical sides defining a small clearance between the inside wall of the housing and the vertical sides.

4. The tablet dispenser according to claim 2, wherein the apron comprises offsets near the dispenser element so as to form shoulders on the vertical sides next to a central sliding block, the shoulders limiting axial motion of the slide.

5. The tablet dispenser according to claim 1, wherein the dispenser element has a shape of a spoon in vertical orientation.

6. The tablet dispenser according to claim 1, wherein the base part is fitted over an outer diameter of the housing with a protuberant grippable knurling, and a turning angle of the rotary closure is limited by stops located on said housing and engageable by protrusions on said base part.

7. The tablet dispenser according to claim 1, wherein the rotary closure can be rotated to prevent actuation of the dispenser element.

8. A tablet dispenser, comprising:

a cylindrical housing for holding tablets therein, having a surrounding side wall and open ends;

a cover closing one open end of said cylindrical housing;

a base part substantially closing an opposite open end of said housing, said base part having a closeable passage therethrough;

a sliding part mounted within said housing and having an actuating bar connected at a first end to an underside of said cover;

said cover being resiliently movable in an axially direction of said housing and having an upwardly concave curved portion and composed of a resilient material having structural memory to reset after being pushed; and an allocating element, shaped to receive a preselected number of tablets from within said housing at one time and operatively connected to a second end of said actuating bar opposite said first end, said allocating element alignable with said passage through said base part, pushing of said cover in a direction toward said base part moves said actuating bar which translates said allocating element at least partially through said passage to deliver said preselected number of tablets to a user.

9. The tablet dispenser according to claim 8, wherein said base part is relatively rotatable with respect to said housing to selectively align said passage with said allocating element to allow dispensing therethrough or alternately to misalign said passage with said allocating element to prevent passage therethrough.

10. The tablet dispenser according to claim 9, further comprising a rotational stop means for positively defining the position of the passage to register with said allocating element for dispensing said preselected amount of tablets, said stop means deployed between said housing and said base part.

11. The tablet dispenser according to claim 8, wherein said sliding part comprises funnel means for guiding tablets within said housing toward said allocating elements.

12. The tablet dispenser according to claim 11, wherein said housing comprises tablet guide means for coacting with said funnel means to guide tablets toward said allocating element.

13. The tablet dispenser according to claim 8, wherein said base part comprises a rotating seal allocated between said base part and said housing to maintain a seal condition at an interface thereof.

14. The tablet dispenser according to claim 8, wherein said allocating element comprises a spoon shaped guide for receiving a single tablet for dispensing through said passage.

15. The tablet dispenser according to claim 8, wherein said resilient material comprises a soft elastic plastic.

16. A tablet dispenser, comprising:

a cylindrical housing for holding tablets therein, having a surrounding side wall and open ends;

a base part substantially closing an open end of said housing, said base part having a closeable passage therethrough;

an actuating member within said housing and actuatable by a user;

an allocating element, shaped to receive a selected number of tablets from within said housing at one time and operatively connected to said actuating member, said allocating element alignable with said passage through said base part, actuating said actuating member moves said actuating member which translates said allocating element at least partially through said passage to deliver said selected number of tablets to a user; and said actuating member having a resiliently resetting press portion actuatable by a user for translating in sliding fashion said allocating element through said passage, the press portion sealingly connected to the housing and resiliently moveable relative thereto.

17. The tablet dispenser according to claim 16, wherein said base part is relatively rotatable with respect to said housing to selectively align said passage with said allocating element to allow dispensing therethrough or alternately to misalign said passage with said allocating element to prevent passage therethrough.

18. The tablet dispenser according to claim 16, further comprising funnel means within said housing for guiding tablets within said housing toward said allocating element.

19. The tablet dispenser according to claim 16, wherein said base part comprises a rotating seal allocated between said base part and said housing to maintain a seal condition at an interface thereof.

20. The tablet dispenser according to claim 16, wherein said allocating element comprises a spoon shaped guide for receiving a single tablet for dispensing through said passage.

21. A tablet dispenser comprising:

a housing;

a cover secured to and forming a hermetic seal with the housing and having an upwardly concave curved portion of soft-elastic plastic material;

a floor part in the housing and having a rotary closure with a passage opening, the rotary closure being adjustable between a passage position upon release of the passage opening and a blocking position upon closure of the passage opening, said rotary closure forming a hermetic seal in the blocking position of the passage opening;

a slide axially movably penetrating the housing, the slide having an actuation rod in an upper region that is snapped into a connector element of the cover, the slide also having a dispenser element in a lower region accepting a tablet which penetrates the passage opening in the floor part; and wherein the upwardly concave curved portion of the cover acts as a resilient restoring element for the dispenser element.

22. The tablet dispenser according to claim 21, wherein the sliding part at the second end of the actuating bar verges into an approximately semicircular diaphragm sized to be guided along an inside wall of the housing, the diaphragm defining an upper supply chamber in the housing inclined obliquely downwards, and which diaphragm continues toward the base part with a vertical apron, and said housing further comprising a vertical guide arranged at a distance from an inside wall of the housing, the diaphragm and the vertical guide together with the apron forming a funnel-shaped chute.

23. The tablet dispenser according to claim 22, wherein the apron has vertical sides defining a small clearance between the inside wall of the housing and the vertical sides.

24. The tablet dispenser according to claim 21, wherein the apron comprises offsets near the dispenser element so as to form shoulders on the vertical sides next to a central sliding block, the shoulders limiting axial motion of the sliding part.

25. The tablet dispenser according to claim 21, wherein the dispenser element has a shape of a spoon in vertical orientation.

26. The tablet dispenser according to claim 21, wherein the base part is fitted over an outer diameter of the housing with a protuberant grippable knurling, and a turning angle of the rotating seal is limited by stops located on said housing and engageable by protrusions on said base part.

27. The tablet dispenser according to claim 21, wherein the rotating closure can be rotated to prevent actuation of the dispenser element.

28. A tablet dispenser, comprising:

a cylindrical housing for holding tablets therein, having a surrounding side wall and open ends;

a cover closing one open end of said cylindrical housing and forming a hermetic seal therewith;

a base part substantially closing an opposite open end of said housing, said base part having a closeable passage therethrough;

a sliding part mounted within said housing and having an actuating bar connected at a first end to an underside of said cover;

said cover being resiliently movable in an axially direction of said housing and having an upwardly concave curved portion and composed of a resilient material having structural memory to reset after being pushed; and an allocating element, shaped to receive a preselected number of tablets from within said housing at one time and operatively connected to a second end of said actuating bar opposite said first end, said allocating element alignable with said passage through said base part, pushing of said cover in a direction toward said base part moves said actuating bar which translates said allocating element at least partially through said passage to deliver said preselected number of tablets to a user.

29. The tablet dispenser according to claim 28, wherein said base part is relatively rotatable with respect to said housing to selectively align said passage with said allocating element to allow dispensing therethrough or alternately to misalign said passage with said allocating element to prevent passage therethrough.

30. The tablet dispenser according to claim 27, further comprising a rotational stop means for positively defining the position of the passage to register with said allocating element for dispensing said preselected amount of tablets, said stop means deployed between said housing and said base part.

31. The tablet dispenser according to claim 28, wherein said sliding part comprises funnel means for guiding tablets within said housing toward said allocating elements.

32. The tablet dispenser according to claim 28, wherein said housing comprises tablet guide means for coacting with said funnel means to guide tablets toward said allocating element.

33. The tablet dispenser according to claim 28, wherein said base part comprises a rotating seal allocated between said base part and said housing to maintain a seal condition at an interface thereof.

34. The tablet dispenser according to claim 28, wherein said allocating element comprises a spoon shaped guide for receiving a single tablet for dispensing through said passage.

35. The tablet dispenser according to claim 28, wherein said resilient material comprises a soft elastic plastic.

36. A tablet dispenser, comprising:

a cylindrical housing for holding tablets therein, having a surrounding side wall and open ends;

a base part substantially closing an open end of said housing, said base part having a closeable passage therethrough;

an actuating member within said housing and actuatable by a user;

an allocating element, shaped to receive a selected number of tablets from within said housing at one time and operatively connected to said actuating member, said allocating element alignable with said passage through said base part, actuating said actuating member moves said actuating member which translates said allocating element at least partially through said passage to deliver said selected number of tablets to a user; and said actuating member having a resiliently resetting press portion actuatable by a user for translating in sliding fashion said allocating element through said passage, the press portion hermetically sealingly connected to the housing and resiliently moveable relative thereto.

37. The tablet dispenser according to claim 36, wherein said base part is relatively rotatable with respect to said housing to selectively align said passage with said allocating element to allow dispensing therethrough or alternately to misalign said passage with said allocating element to prevent passage therethrough.

38. The tablet dispenser according to claim 36, further comprising funnel means within said housing for guiding tablets within said housing toward said allocating element.

39. The tablet dispenser according to claim 36, wherein said base part comprises a rotating seal allocated between said base part and said housing to maintain a seal condition at an interface thereof.

40. The tablet dispenser according to claim 36, wherein said allocating element comprises a spoon shaped guide for receiving a single tablet for dispensing through said passage.

* * * * *